J. WAGNER.
PISTON.
APPLICATION FILED MAR. 8, 1920.

1,355,519. Patented Oct. 12, 1920.

INVENTOR,
James Wagner.
BY John A. Bomnhardt
ATT'Y.

UNITED STATES PATENT OFFICE.

JAMES WAGNER, OF CLEVELAND, OHIO.

PISTON.

1,355,519.     Specification of Letters Patent.     Patented Oct. 12, 1920.

Application filed March 8, 1920. Serial No. 364,217.

*To all whom it may concern:*

Be it known that I, JAMES WAGNER, a citizen of the United States, residing at Cleveland, in the county of Cuyahoga and State of Ohio, have invented certain new and useful Improvements in Pistons, of which the following is a specification.

This invention relates to pistons and packings therefor, and has for its object to provide an improved packing construction which will readily adapt itself to the inside walls of cylinders, whether they be old or new, even or uneven. Further, due to the construction, the packing parts of the piston may be adjusted to compensate for wear.

Further objects of the invention pertain to the simplicity of construction, freedom of unnecessary parts, the reduction of friction to a minimum, but with a corresponding efficient sealing against the cylinder walls, thereby reducing the loss of compression and the provision of a device which may be utilized in either a steam or internal combustion engine with but slight modifications.

With these and other objects in view the invention consists in the certain novel features of construction and combination of parts hereinafter illustrated, described and particularly pointed out in the following description and claims.

Figure 1:
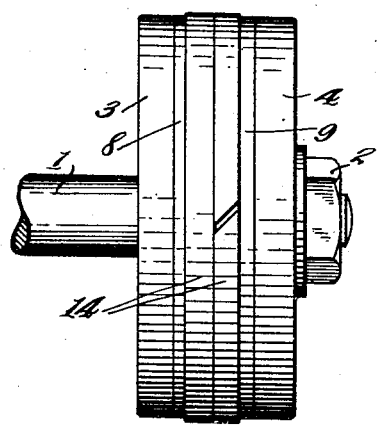
Figure 2:
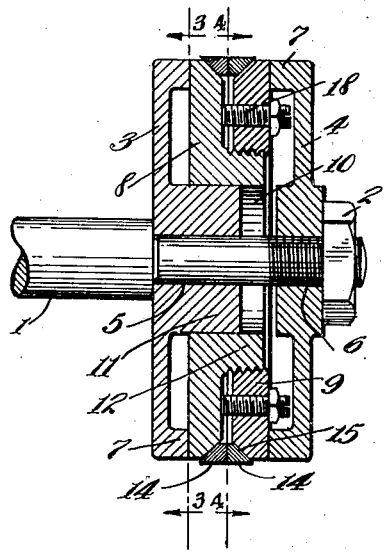
Figure 3:
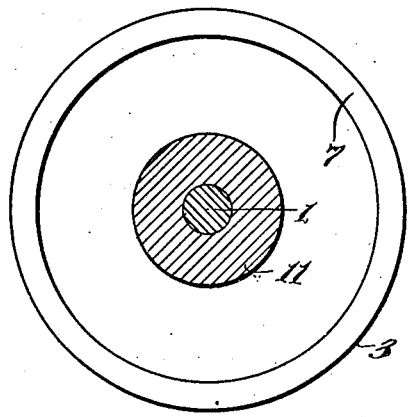
Figure 4:
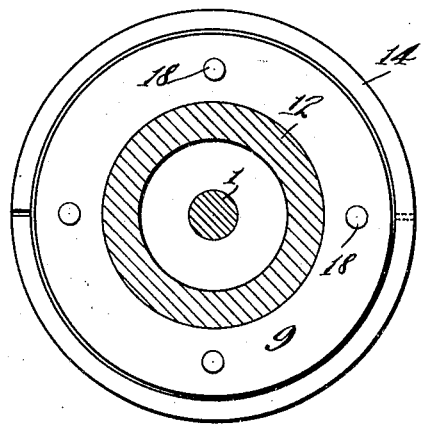

Reference being had to the accompanying drawings, wherein like numerals designate similar parts throughout the various views Figure 1 is a side elevation of a piston constructed in accordance with the principles above set forth; Fig. 2 is a section, and Figs. 3 and 4 are transverse sections on the lines 3—3 and 4—4 of Fig. 2.

The invention comprises the customary piston rod 1 upon the reduced end of which the elements comprising the piston are secured by means of a nut 2. The aforementioned elements comprise a pair of heads 3 and 4 both of which are provided with central bores 5 and 6 whereby they may be placed upon the piston rod. The heads are further provided with peripheral inwardly projecting flanges 7 against the edges of which ring disks 8 and 9 are clamped. The disks 8 and 9 are provided with central bores 10 by means of which they are centrally located with respect to the heads by being placed upon the exterior of a central cylindrical boss 11 formed as part of the head 3. Upon one face of the disk 8 is provided an externally threaded boss 12 upon which the ring disk 9 is screwed, and a pair of transversely split rings 14, each provided with inclined faces 15 are placed between the disks 8 and 9 with their inclined faces bearing upon similar inclined faces on the disks 8 and 9. The disk 9 is further provided with a plurality of set screws 18 for a purpose to be hereinafter described.

In use when it is desired to adjust the engagement of the rings 14 with respect to the cylinder walls the head 4 is first removed by unscrewing the nut 2 upon the piston rod. The pressure exerted by the screws 18 against the disk 8 is relieved and the disk 9 is screwed on the boss 11 toward or from the disk 8 accordingly as the diameter of the rings is to be increased or decreased. When it is to be increased a radial thrust is exerted upon the rings 14, due to the inclined faces 15. After the desired adjustment of the rings 14 has been obtained the set screws 18 are forced against the disk 8 in a manner to prevent any movement of the disks with respect to each other. The head 4 is then placed in position and the nut 2 applied with sufficient pressure to firmly clamp the foregoing elements in final position.

By the foregoing construction it will be seen that a piston is provided by means of which any undue wear may be staisfactorily taken up without the expense of new parts, and it is also evident that the same principle may be applied with equally satisfactory results to a piston such as is used on internal combustion engines, in which case the head 3 would form the piston body proper. And while I have shown and described this particular embodiment of the invention it is evident that various modifications may be had and I do not wish to limit myself in the construction of the same further than is required by the state of the art or that which comes within the scope of the appended claims.

I claim:

1. A piston packing comprising opposed disks screwed together and inclosed in the body of the piston, said disks having beveled outer edges, and a beveled packing ring inclosed between said beveled edges and adapted to be expanded by screwing the disks together.

2. The combination with a piston having opposed spaced heads, one of which has an inner central boss, of a pair of ring disks located between said heads and mounted upon said boss, said disks being screwed together for adjustment toward and from each other and having adjacent beveled peripheral edges, and a beveled packing ring located between said edges and expansible by screwing the disks closer together.

3. A piston packing comprising opposed disks screwed together and inclosed in the body of the piston, said disks having beveled outer edges, and a beveled packing ring inclosed between said beveled edges and adapted to be expanded by screwing the disks closer together, and set screws extending through one disk and engaging the other to hold the disks as adjusted.

4. The combination of opposed spaced heads having inwardly projecting flanges at the outer edges thereof, a pair of ring disks screwed together and clamped at their outer edges between said flanges, said disks having beveled outer edges, and a beveled packing ring between said edges.

In testimony whereof, I do affix my signature in presence of two witnesses.

JAMES WAGNER.

Witnesses:
JOHN A. BOMMHARDT,
ROBERT L. BRUCK.